(12) United States Patent
Min

(10) Patent No.: US 6,970,526 B2
(45) Date of Patent: Nov. 29, 2005

(54) CONTROLLING THE SYSTEM TIME CLOCK OF AN MPEG DECODER

(75) Inventor: Kyung Pa Min, Seoul (KR)

(73) Assignee: Hynix Semiconductor Inc., Ichon-shi (KR)

(*) Notice: Subject to any disclaimer, the term of this patent is extended or adjusted under 35 U.S.C. 154(b) by 742 days.

(21) Appl. No.: 09/993,699

(22) Filed: Nov. 27, 2001

(65) Prior Publication Data

US 2002/0063796 A1    May 30, 2002

(30) Foreign Application Priority Data

Nov. 27, 2000  (KR) ............................... 2000-70984

(51) Int. Cl.[7] ............................................. H04L 7/00
(52) U.S. Cl. ................ 375/354; 375/373; 375/240.28; 375/376; 375/368; 331/17; 713/503; 711/219; 348/441; 370/503; 704/500
(58) Field of Search ................................ 375/354, 373, 375/240.28, 376; 713/503; 704/500; 711/219; 331/17; 348/441; 370/503

(56) References Cited

U.S. PATENT DOCUMENTS

| | | | |
|---|---|---|---|
| 5,699,392 A | | 12/1997 | Dokic |
| 5,881,114 A | * | 3/1999 | Moon .......................... 375/376 |
| 5,917,873 A | * | 6/1999 | Shiomoto et al. ........... 375/376 |
| 5,923,220 A | * | 7/1999 | Honma ........................ 331/17 |
| 6,021,168 A | * | 2/2000 | Huh ............................. 375/376 |
| 6,101,591 A | * | 8/2000 | Foster et al. ................. 711/219 |
| 6,118,486 A | * | 9/2000 | Reitmeier .................... 348/441 |
| 6,195,392 B1 | * | 2/2001 | O'Grady ................ 375/240.28 |
| 6,208,666 B1 | * | 3/2001 | Lawrence et al. .......... 370/503 |
| 6,300,838 B1 | * | 10/2001 | Kelkar ......................... 331/17 |
| 6,330,285 B1 | * | 12/2001 | Crosby et al. ......... 375/240.28 |
| 6,356,871 B1 | * | 3/2002 | Hemkumar et al. ........ 704/500 |
| 6,598,172 B1 | * | 7/2003 | VanDeusen et al. ........ 713/503 |
| 6,801,591 B1 | * | 10/2004 | Frencken ..................... 375/373 |

* cited by examiner

Primary Examiner—Stephen Chin
Assistant Examiner—Sudhanshu C. Pathak
(74) Attorney, Agent, or Firm—Birch, Stewart, Kolasch & Birch, LLP

(57) ABSTRACT

During decoding and processing of program clock reference (PCR) values in MPEG-2 transport streams, a first initial difference value is obtained by calculating a difference between a first detected PCR value and a system time clock (STC) value generated when the first PCR value is detected. Depending on the update status of the PCR values, a second initial difference value is obtained by calculating a difference between a second detected PCR value and a STC value generated when the second PCR value is detected. Thereafter, a composite difference value is obtained by further calculating a difference between the first initial difference value and the second initial difference value. Subsequently, the first and second initial difference values, and the composite difference values are calculated for a predetermined number of detected PCR values so that the decoder clock signal is generated and maintained at approximately the same frequency as an encoder clock signal.

18 Claims, 9 Drawing Sheets

CONTROLLING THE SYSTEM TIME CLOCK OF AN MPEG DECODER

BACKGROUND OF THE INVENTION

1. Field of the Invention

The present invention relates to Moving Picture Expert Group-2 (MPEG-2) technology, and more particularly, to a method and device for controlling a System Time Clock (STC) of an MPEG decoder, in which the STC being used as a standard for synchronization during multi-decoding is effectively controlled.

2. Background of the Related Art

Generally, digital video technology is used in various fields, such as computers and home appliances, as well as in communications technology, such as video conferencing and video telephones. Particularly, various apparatuses for recording and reproducing digital video signals, such as digital video cassette recorders and digital video cassettes, adopt MPEG standards of media (such as MPEG-2) for storing digital video signals.

The MPEG standards provide for the transmission of digital information by dividing digital data into packets forming data bit streams, which are multiplexed onto a single data channel. One standard for the multiplexing of bit streams from several audio, video, and/or auxiliary data sources has been developed by the ISO MPEG and set forth in draft form in a document entitled, "Coding of Moving Pictures and Associated Audio" (ISO/IEC JTC1/SC29/WG11N 0801, published on Nov. 13, 1994, by the ISO/IEC Copyright Office, Geneva, Switzerland, hereby incorporated by reference).

Appropriate encoding and decoding are required to ensure proper transmission and reproduction of digital data. When a digital signal is encoded into data packets for transmission as system bit streams, clock reference values which represent values of an encoder counter clocked by a stable clock having a frequency that is proportional to the sampling frequency of the digital signal to be transmitted, are encoded together with the digital signal. Upon receiving digital signals, decoding of the data packets in the digital signal needs to be performed by producing a decoder clock using the clock reference values contained in the data packets. Using a clock recovery system in an MPEG decoder minimizes the differences between an encoder clock and a decoder clock so that the decoder clock is maintained at approximately the same frequency as the encoder clock, allowing proper presentation of digital signals.

According to the MPEG-2 standards, a system bit stream includes a program stream and a transport stream. The program stream is comprised of elementary streams for respective bit columns of video data, audio data and user data. The elementary streams are packeted in Packetized Elementary Streams (PES). Program streams are used in optical discs and multimedia applications having relatively small error rates. Transport streams are used for media, such as broadcasting media, having relatively large error rates.

To decode a system bit stream, an MPEG-2 decoder includes a transport stream decoder and a program stream decoder. A Program Clock Reference (PCR) is used for the transport stream decoder, while a System Clock Reference (SCR) is used for the program stream decoder. The PCR and SCR are used for clock synchronization of a decoder and an input bit stream, and for Presentation Synchronization (PS) of audio and video data. Although the PCR and the SCR are respectively used for different decoders, they have the same function. As such, only the clock timing synchronization aspects of a transport stream decoder using the PCR values in a transport stream will be explained for the sake of brevity.

A related art MPEG-2 decoder having a clock recovery system therein will be described with reference to the accompanying drawings. FIG. 1 is a schematic view of a clock recovery system according to the related art.

As shown in FIG. 1, the related art clock recovery system includes a subtractor 1, a Low Pass Filter (LPF)/gain controller 2, an STC counter 3, and a Voltage Controlled Oscillator (VCO) 4. A PCR extractor (not shown) obtains, from a bit stream received through an input terminal of the MPEG-2 decoder, a PCR value representing a count value generated by an encoder counter when that PCR value was generated. A plurality of PCR values from a plurality of bit streams are obtained by the PCR extractor during the decoding process. Each of the obtained PCR values is provided to both the subtractor 1 and the STC counter 3.

Initially, the first PCR value obtained by the PCR extractor is provided to the STC counter 3. The initial count value of the STC counter 3 is set as the first PCR value extracted by the PCR extractor, and the STC counter 3 counts at an initial system clock frequency obtained from the VCO 4. Thereafter, upon receipt of each subsequent PCR value during the decoding process, the current count value of the STC counter 3 is provided to the subtractor 1.

The subtractor 1 calculates the difference between the PCR value obtained from the PCR extractor and a current STC value received from the STC counter 3, and outputs the results thereof. The LPF/gain controller 2 outputs a control signal to the VCO 4 by low pass filtering the output from the subtractor 1 and controlling the gain thereof. The VCO 4 varies a local clock frequency and then outputs a control signal so that the STC counter 3 counts at a system clock frequency of 27-MHz. The VCO 4 also outputs a 27-MHz decoder clock signal to an output terminal. The above process is repeated accordingly, so that the decoder clock is continuously synchronized with the encoder clock having a frequency of 27-MHz.

FIG. 2 is a schematic view of another clock recovery system according to the related art. The clock recovery system of FIG. 2 includes an STC counter 21, a PCR register 22, an STC register 23, a Pulse Width Modulator (PWM) 24, a Micro-Controller Unit (MCU) 27, an LPF/gain controller 25, and a VCO 26.

The processing involved is similar to that of the related art clock recovery system shown in FIG. 1, except that a PCR value and an STC value at the time when that PCR value is input are both provided to the MCU 27 for calculating the difference between the PCR value and the STC value. Also, the PCR register 22 temporarily stores the PCR values extracted from the PCR extractor, while the STC register 23 temporarily stores the STC values output from the STC counter 21. Instead of a subtractor, the MCU 27 receives and calculates the difference between a PCR value temporarily stored in the PCR register 22 and a STC value temporarily stored in the STC register 23. The PWM 24 generates a PWM signal in response to the difference value calculated by the MCU 27, and outputs a PWM signal to the LPF/gain controller 25.

The LPF/gain controller 25 outputs an analog voltage signal obtained by low pass filtering the PWM signal and controlling the gain thereof, so that the VCO 26 is driven. As the VCO 4 shown in FIG. 1, the VCO 26 varies a local clock frequency and then outputs a control signal so that the STC counter 3 counts at a system clock frequency of 27-MHz. The VCO 26 also outputs the system clock frequency of 27-MHz to an output terminal. The above process is repeated accordingly, so that the decoder clock is continuously synchronized with the encoder clock having a frequency of 27-MHz.

In addition to synchronizing the decoder clock frequency with the encoder clock frequency, audio and video synchronization (e.g., lip synchronization for matching a person's lip movements displayed visually with the person's audible voice to be generated) are also required for proper presentation of digital data to the user. The various aspects of lip synchronization can be understood by considering the transport stream syntax depicted in FIGS. 3 and 4.

FIG. 3 is a diagram of a transport stream syntax according to the related art. The MPEG-2 standard provides for the transmission of digital information from multiple signal sources by dividing the digital data into a number of packets. In the transport stream syntax required by the MPEG-2 standard, as shown in FIG. 3, all audio, video, and auxiliary information are transmitted in packet types. Respectively different Program Identifiers (PIDs) are used in accordance with different types of audio, video, and auxiliary information.

FIG. 4 is a diagram of a PES packet syntax according to the related art. The audio and video information, as shown in FIG. 4, are formed in PES packet types, and transmitted after being transformed into the transport packet types shown in FIG. 3.

Here, problems related to lip synchronization occurs when processing and outputting audio and video data. To solve such problems, the matching of lip synchronization between the PCR in the transport packet header, and a Decode Time Stamp (DTS) and a Presentation Time Stamp (PTS) in the PES header has been proposed in the MPEG-2 standard. The DTS indicates when a picture must be decoded, while a PTS indicates when the picture must be presented to the decoder output.

To achieve lip synchronization, an encoder inserts a counter value being clocked at a clock frequency of 27-MHz into a PCR location of the transport packet header. Also, an encoder counter value being successively increased is inserted into the PES header as a DTS value or PTS value for audio or video data. This type of processing can be referred to as time stamping.

Subsequently, the decoder uses the first received PCR value to set and initialize the STC counter, and the STC counter begins counting at an initial system clock frequency. Thereafter, upon receipt of each subsequent PCR value during the decoding process, the current count value of the STC counter is provided to a subtractor and further processed so that the count value of the STC counter is adjusted. During this process, the DTS value in the PES header is detected, and the detected DTS value is compared with the adjusted STC value. If the compared value is within an acceptable error range, decoding of the received data is performed. Also, when the PTS value in the PES header is detected, the PTS value is compared with the STC value of that time. If the compared value is within an acceptable error range, presentation of the received data is performed. Here, the PCR value consists of a PCR-base value of 33 bits and a PCR-extension value of 9 bits.

However, if a clock signal of 27-MHz used in the decoder is not accurately synchronized with the clock signal in the encoder, problems may occur. For example, if the actual decoder clock frequency is a little slower than an ideal clock frequency of 27-MHz, a buffer empty state may be erroneously achieved when the DTS or PTS detected in the decoder is compared with the STC value, and found to be greater than the acceptable error range, resulting in the erroneous skipping of the DTS or PTS. Conversely, the DTS or PTS compared with the STC may be found to be smaller than the acceptable error range if the actual decoder clock frequency is a little faster than an ideal clock frequency of 27-MHz, and a buffer full state may be erroneously achieved.

The related art clock recovery system of the MPEG-2 decoder suffers from another problem. In a digital television system adapted to the MPEG-2 standard, a maximum of five to six programs can be provided for one broadcasting channel. If the MPEG-2 decoder receives a transmitted broadcasting signal to decode all five or six programs therein, each of the programs has an individual STC, and thus a counter, a low pass filter, subtractor, and a VCO are respectively required for each type of program. This increases the overall complexity and cost of hardware components.

SUMMARY OF THE INVENTION

Accordingly, the present invention is directed to a method and device for controlling a System Time Clock (STC) of an MPEG decoder that substantially obviates one or more of the problems due to limitations and disadvantages of the related art.

The present invention provides a method and device for controlling an STC of an MPEG decoder, which simplifies a configuration for management and correction of an STC value and improves accuracy of the STC value.

Additional advantages and features of the invention will be set forth in part in the description which follows and in part will become apparent to those having ordinary skill in the art upon examination of the following or may be learned from practice of the present invention. The advantages of the invention may be realized and attained as particularly pointed out in the appended claims.

To achieve these and other advantages and in accordance with the purpose of the present invention, as embodied and broadly described, a device for controlling an STC of an MPEG decoder according to the present invention includes: a first subtractor for receiving an n number of PCR values PCR1, PCR2, . . . , PCRn and an STC value and outputting a gap value between the PCR values and the STC value; a controller for determining whether the current PCR value has been updated two or more times; an n number of difference (DIF) registers for storing the gap value of the first subtractor if the PCR value has not been updated two or more times under the control of the controller; a second subtractor for calculating a gap value between the output value of the first subtractor and the value stored in the n number of DIF registers if the PCR value has been updated two or more times, and storing the gap value in n number of gap registers; a mean calculator for obtaining a mean value by receiving the resultant value of the second subtractor stored in the respective gap registers; an LPF/gain controller for outputting an output value of the mean calculator by low pass filtering and controlling gain; a voltage controlled oscillator for outputting an increased clock of 27-MHz by receiving a value low pass filtered by the LPF/gain controller; and a temporary STC counter for counting the clock signal of 27-MHz to output the counted value to the first subtractor.

In another aspect, a method for controlling an STC of an MPEG decoder according to the present invention includes the steps of: increasing a Temp_STC value to 27-MHz through an initial reset step; detecting the presence of a PCR value in the Temp STC value to load the Temp_STC value; calculating a gap value between the detected PCR value and the loaded Temp_STC value to obtain first resultant values and determining whether the current PCR value has been updated two or more times; storing the first resultant values in a corresponding register according to the determination result to return to the step of detecting the PCR value, or calculating a gap value between the first resultant values and a value stored in the corresponding register in the previous step to obtain second resultant values; updating the first resultant values and storing the second resultant values; determining whether entire PCR values have been updated two or more times; obtaining a mean value of the second resultant values if the entire PCR values have been updated two or more times, or returning to an initial detecting step of the PCR values if the entire PCR values have not been updated two or more times; and outputting a controlled clock of 27-MHz using the mean value of the second resultant values.

It is to be understood that both the foregoing general description and the following detailed description are exemplary and explanatory and are intended to provide further explanation of the invention as claimed.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

One broad aspect of the present invention employs a feedback mechanism for calculating, over a period of time, a difference between each PCR value and each corresponding STC value, and calculating an arithmetic mean value for a predetermined number of calculated differences. The calculated arithmetic means is then used to adjust the decoder clock signal generation. As such, the present invention can be considered to involve a smoothing of the differences between a detected encoder clock signal and a decoder clock signal to be generated, the smoothing being performed over a period of time.

Reference will now be made in detail to the preferred embodiments of the present invention, examples of which are illustrated in the accompanying drawings.

Figure 1:
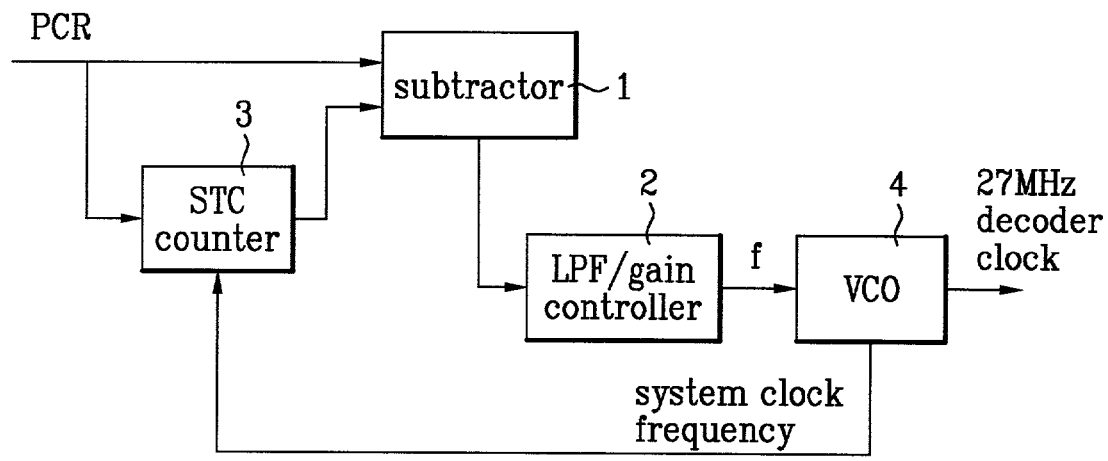
FIG. 1 is a schematic view of a related art clock recovery system.
Figure 2:
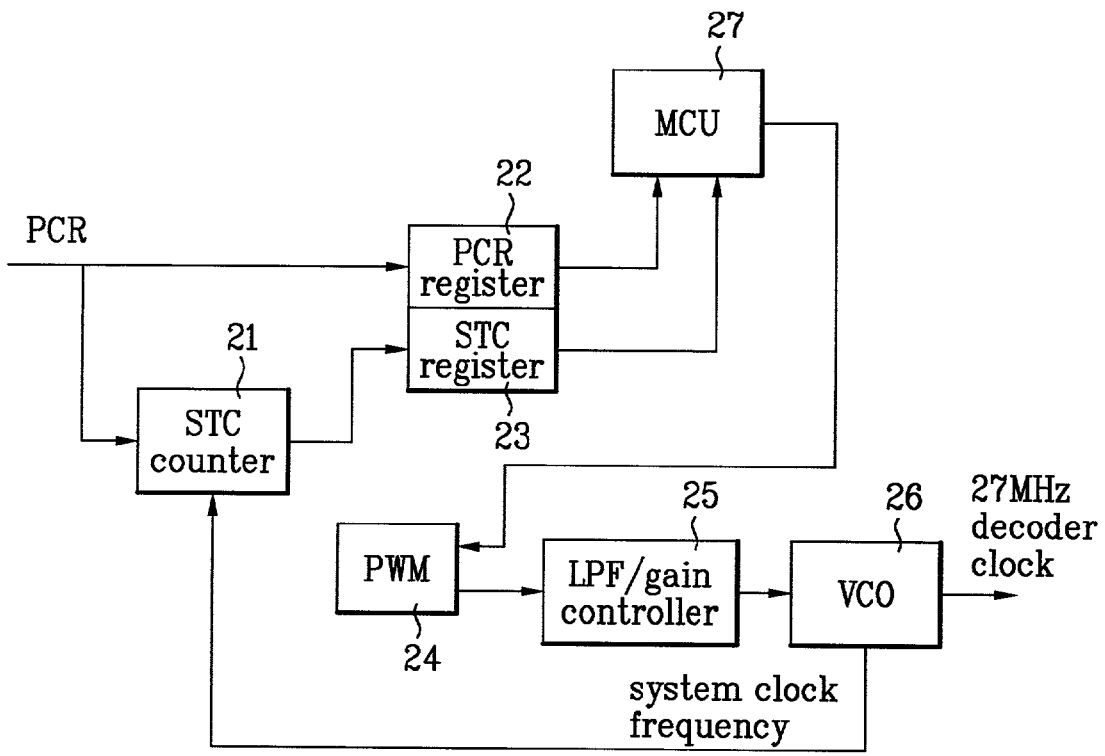
FIG. 2 is a schematic view of another related art clock recovery system.
Figure 3:
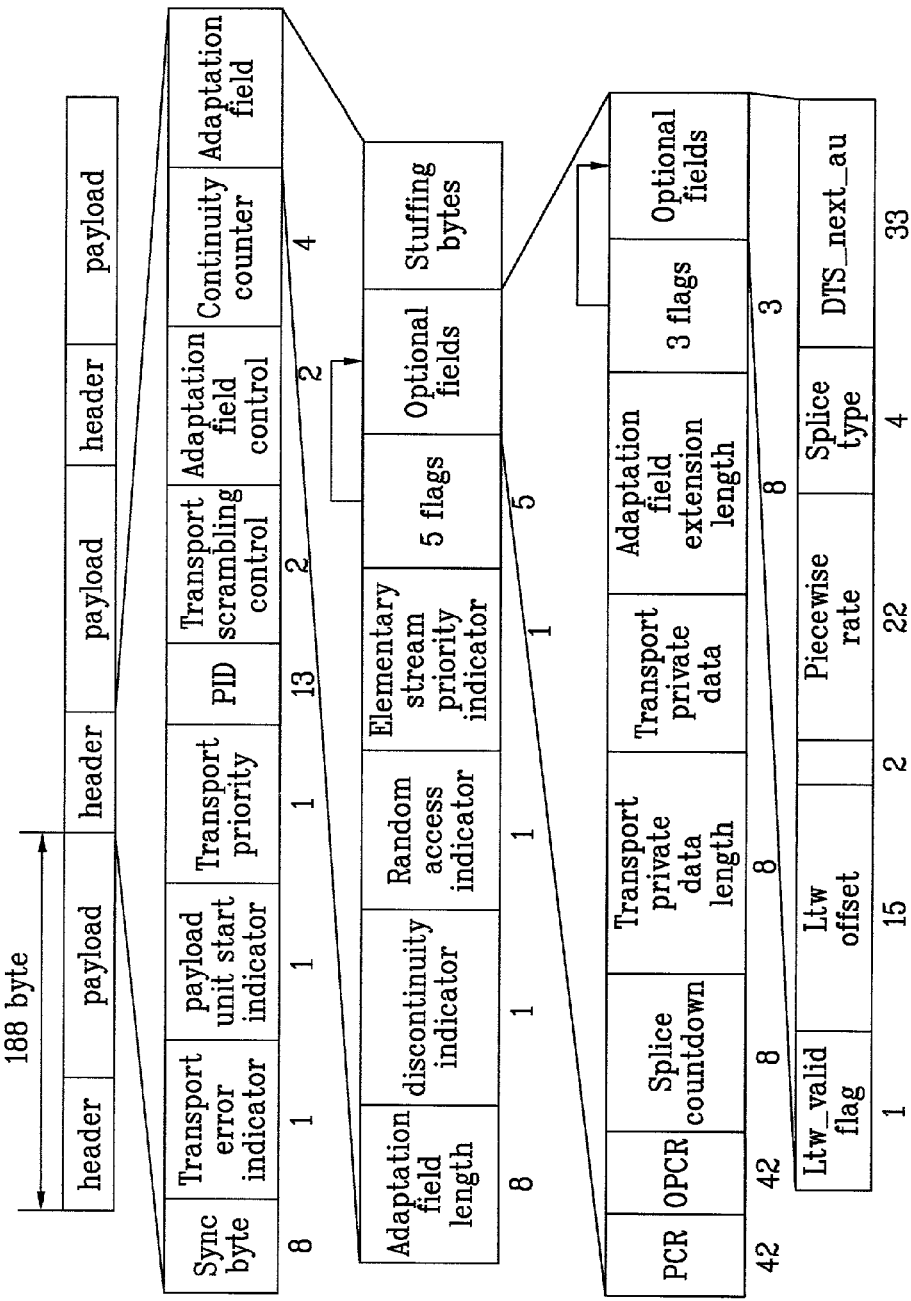
FIG. 3 is a diagram showing a transport stream syntax.
Figure 4:
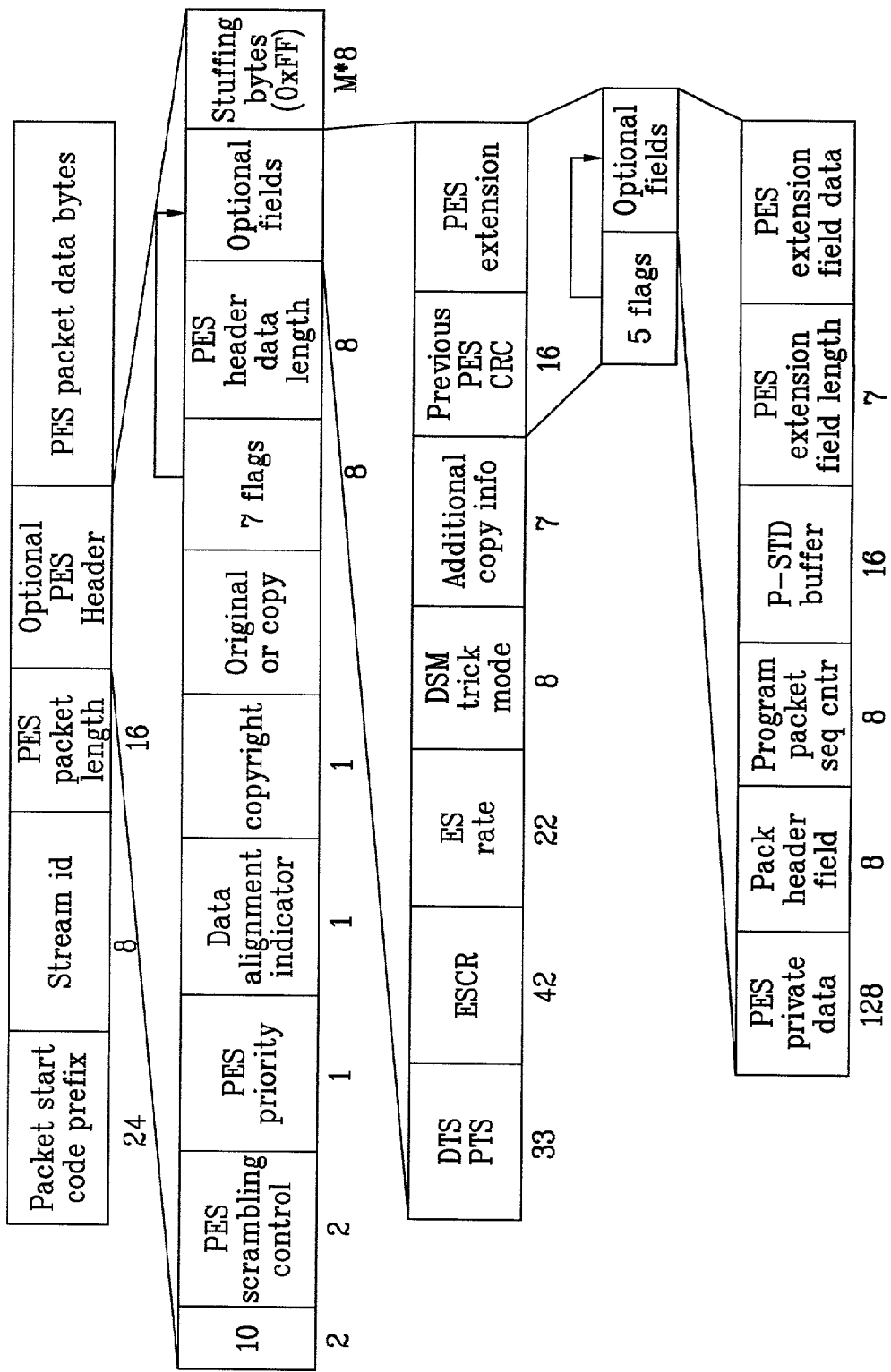
FIG. 4 is a diagram of a PES packet syntax.
Figure 5:
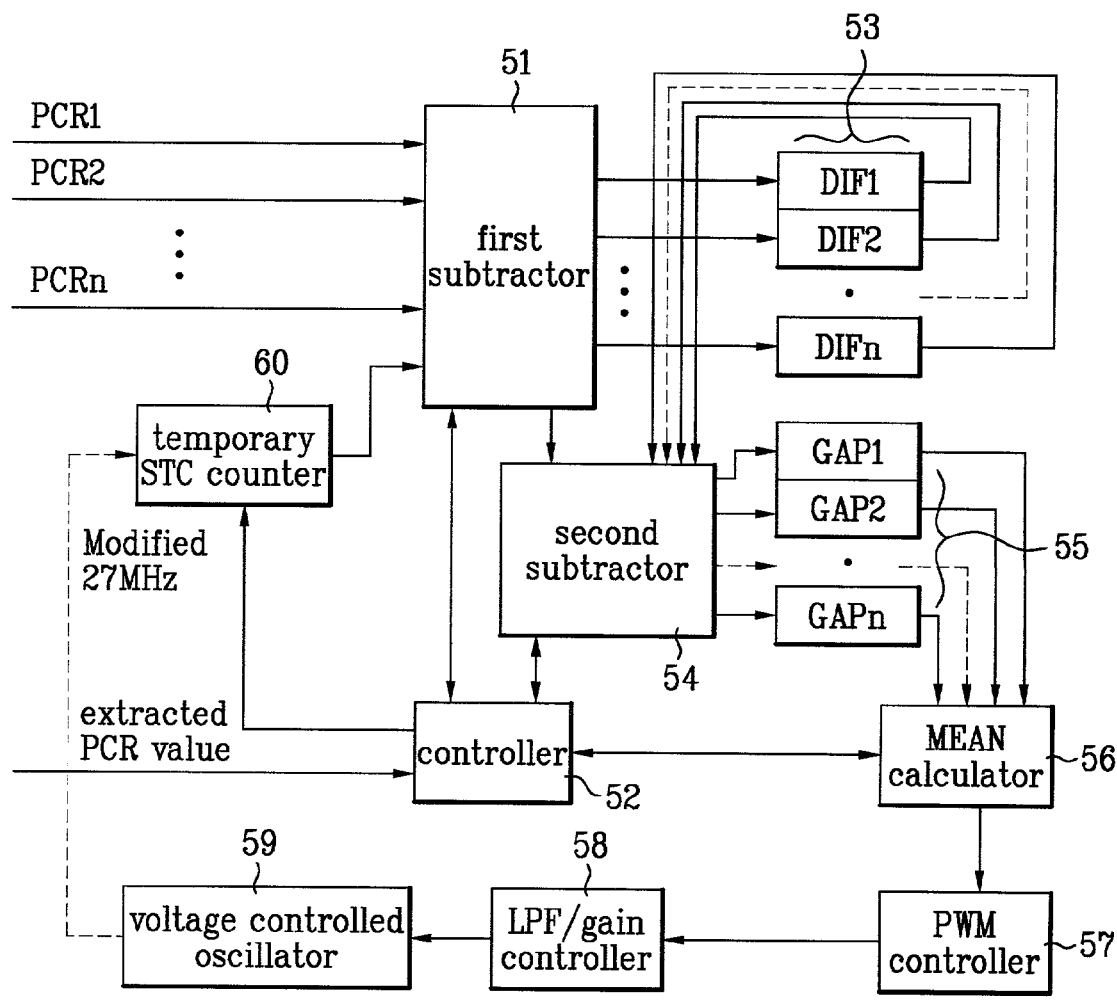
FIG. 5 is a block diagram showing a device for controlling an STC according to the first embodiment of the present invention.

A device for controlling a system time clock (STC) according to the first embodiment of the present invention will be described with reference to FIGS. 5 and 6.

The first embodiment of the present invention includes a first subtractor 51 for receiving an n number of PCR values (PCR1, PCR2, . . . , PCRn) and receiving an STC value, and outputting a gap value (i.e., the difference between a PCR value and a STC value), a controller 52 for determining whether the current PCR value has been updated two or more times, an n number of DIF registers 53 for storing the gap value of the first subtractor if the PCR value has not been updated two or more times under the control of the controller 52, a second subtractor 54 for calculating a gap value between the output value of the first subtractor 51 and the value stored in the n number of DIF registers 53 if the PCR value has been updated two or more times, an n number of gap registers 55 for storing the resultant value of the second subtractor 54, and a mean calculator 56 for obtaining a mean value by receiving the resultant value of the second subtractor 54, stored in the respective gap registers 55.

The device for controlling an STC further includes an LPF/gain controller 58 for outputting an output value of the mean calculator 56 by low pass filtering and controlling gain, a voltage controlled oscillator 59 for outputting an increased clock of 27-MHz by receiving a value low pass filtered by the LPF/gain controller 59, and a temporary STC counter 60 for counting the clock of 27-MHz from the voltage controlled oscillator 59 to output the counted value to the first subtractor 51. Meanwhile, the output value of the mean calculator 56 is input to the LPF/gain controller 58 through the PWM controller 57. The controller 52 controls the temporary STC counter 60, the first subtractor 51, the second substractor 54, and the mean calculator 56, and receives a PCR value extracted from an external PCR extractor (not shown).

According to the ATSC of the U.S.A., a PCR value should be transmitted at least once per 100 milliseconds. In other words, transmission of the PCR value is required ten times or more per second. In general, the PCR value included in a transport stream is continuously updated and then transmitted to the receiving party. The receiving party has to control its clocks by updating the transmitted PCR values.

Figure 6A:
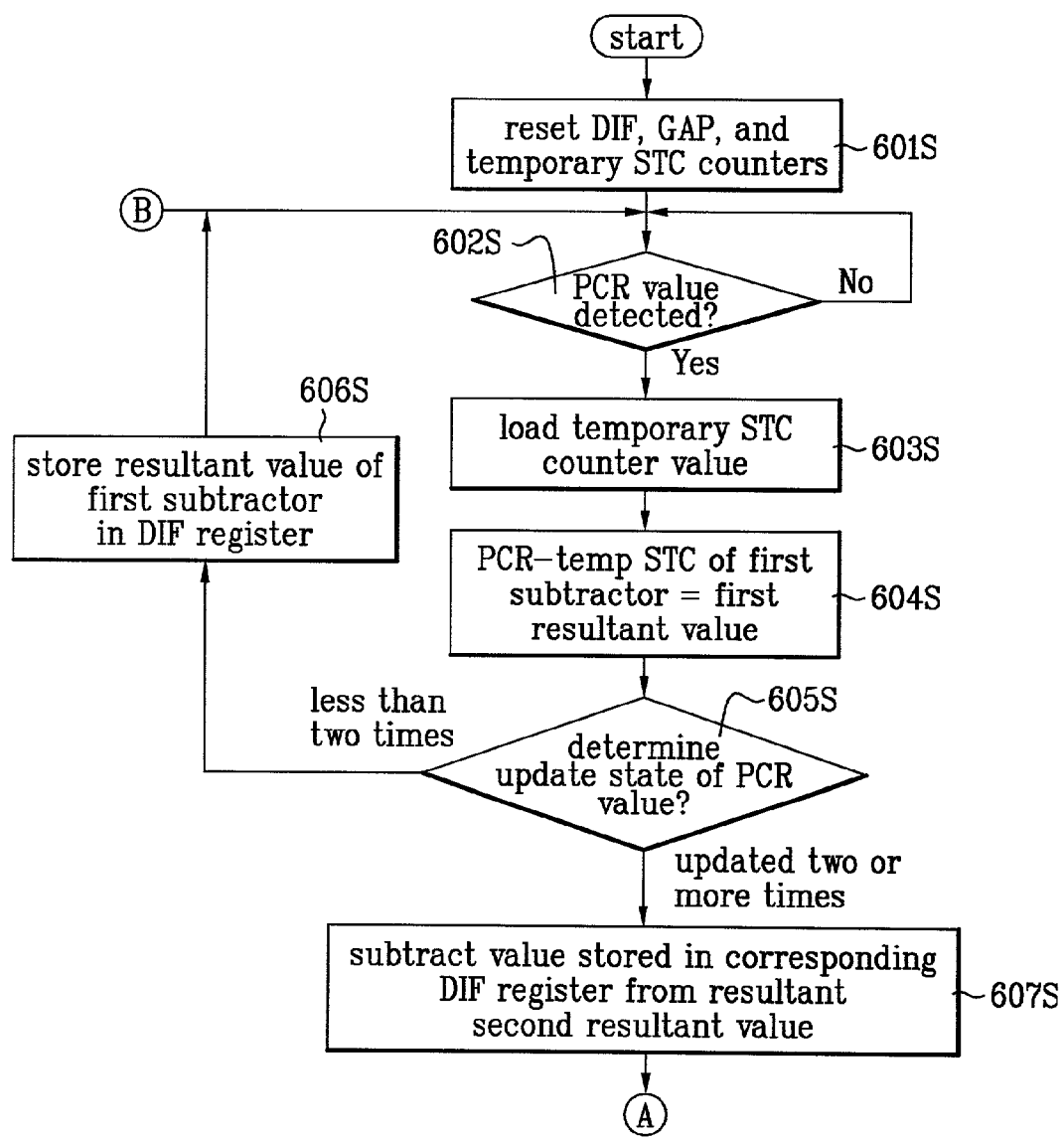
FIGS. 6a and 6b are flowcharts showing a method for controlling an STC according to the first embodiment of the present invention.
Figure 6B:
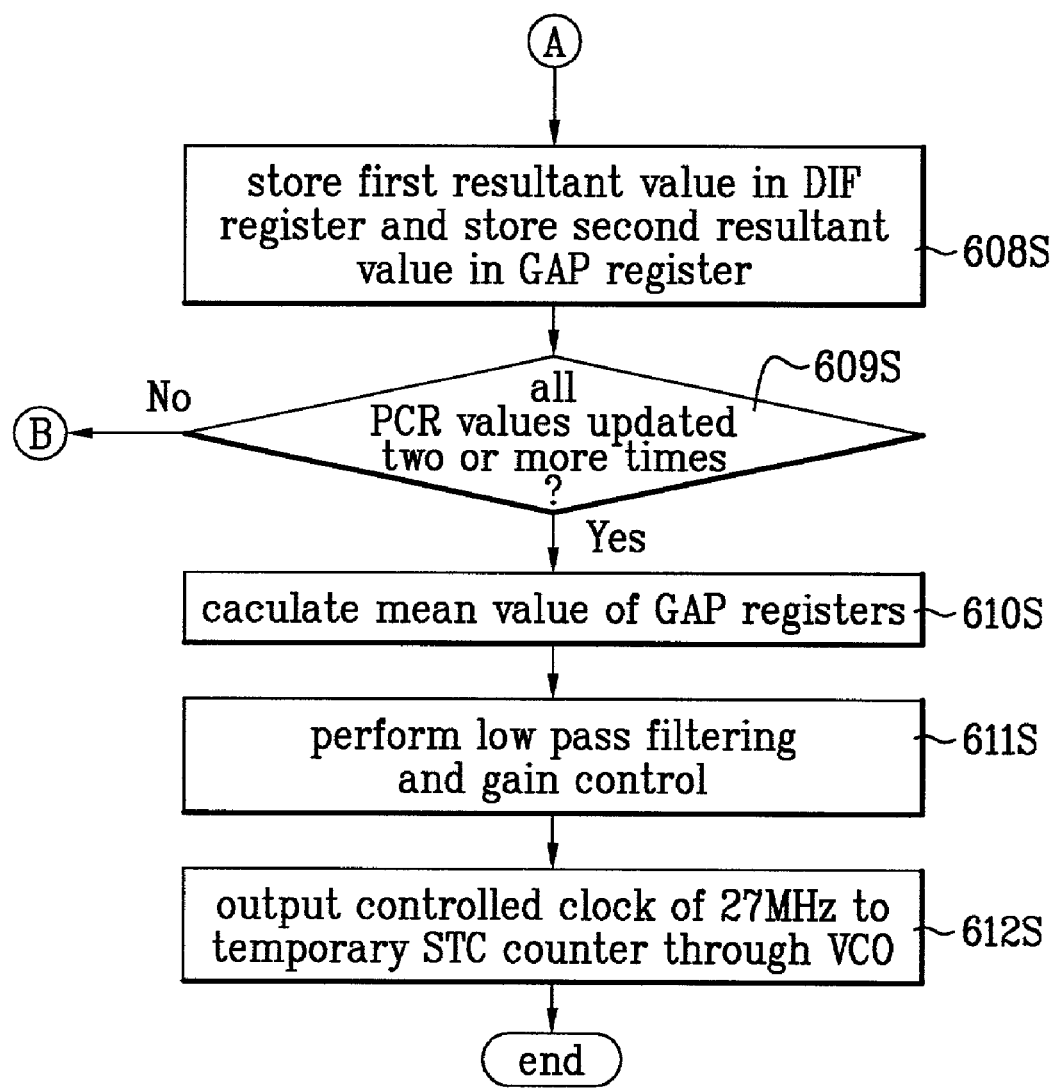

The operation of the first embodiment will be explained as follows. As shown in FIGS. 6A and 6B, as the clock recovery device begins operation, the DIF registers 53, the gap registers 55 and the temporary STC counter 60 are reset (601 S). The clock recovery device uses the first PCR value extracted from a digital data stream and received by the controller 52 to newly set the temporary STC counter 60, which begins counting at an initial system clock frequency received from the voltage controlled oscillator 59. Thereafter, subsequent PCR values are detected during the clock recovery process (602S). When a PCR value is detected, the current count value (Temp_STC) of the temporary STC counter 60 at the time of PCR value detection is loaded into a first subtractor 51 (603S).

Subsequently, the first subtractor 51 calculates a gap (i.e., difference) value between the detected PCR value and the loaded Temp_STC value to obtain a first resultant value (604S). Then, it is determined whether the current PCR value has been updated two or more times (605S). If not, the first resultant value (i.e., the difference between the detected PCR value and the loaded Temp_STC value) is stored in the corresponding DIF register and the clock recovery process returns to the step of detecting subsequent PCR value (606S).

The PCR value is updated two or more times to synchronize a signal of the transmitting party with the signal of the receiving party during transmission and reception of data. The receiving party increases a first PCR value received from the transmitting party at 27 MHz clock and compares a counter value increased at the receiving party with a second PCR value of the transmitting party upon receipt of the second PCR value. As a result, a difference occurs between clocks of the receiving party and clocks of the transmitting party. The receiving party compensates the difference. The above process is repeated so that a clock of 27 MHz is synchronized between the transmitting party and the receiving party. For such synchronization, both the transmitting party and the receiving party use a clock having the same period. For example, if the transmitting party uses a clock of 27.00001 MHz, the receiving party should use a clock of 27.00001 MHz.

If the PCR value has been updated two or more times, the gap value between the first resultant value and the value previously stored in the corresponding DIF register is calculated by a second subtractor 54 to obtain a second resultant value (607S). Subsequently, the first resultant value is updated in the DIF register, and the second resultant value is stored in the appropriate gap register (608S).

Then, it is determined whether all the PCR values have been updated two or more times (609S). If so, the mean of all the values stored in the gap registers is obtained (610S). If all the PCR values have not been updated two or more times, the step returns to the step of detecting the initial PCR value, the above process is repeated. Subsequently, the mean value is low pass filtered and gain-controlled (611S). The controlled clock of 27-MHz is output to the temporary STC counter through the VCO (612S).

In the aforementioned device and method for controlling an STC according to the first embodiment of the present invention, the STC counter can be used regardless of the respective PCR values during multi-decoding. It is possible to successively store the gap value between the respective PCR value and the STC counter value. Thus, it is possible to control the STC more exactly.

The device and method for controlling the STC according to the second embodiment of the present invention will be described with reference to FIGS. 7 and 8.

In this second embodiment, the STC is controlled by using an interrupt control function based on the MCU without using a subtractor. The device for controlling the STC according to the second embodiment of the present invention also includes an n number of temporary STC registers for storing temporary STC values.

Figure 7:
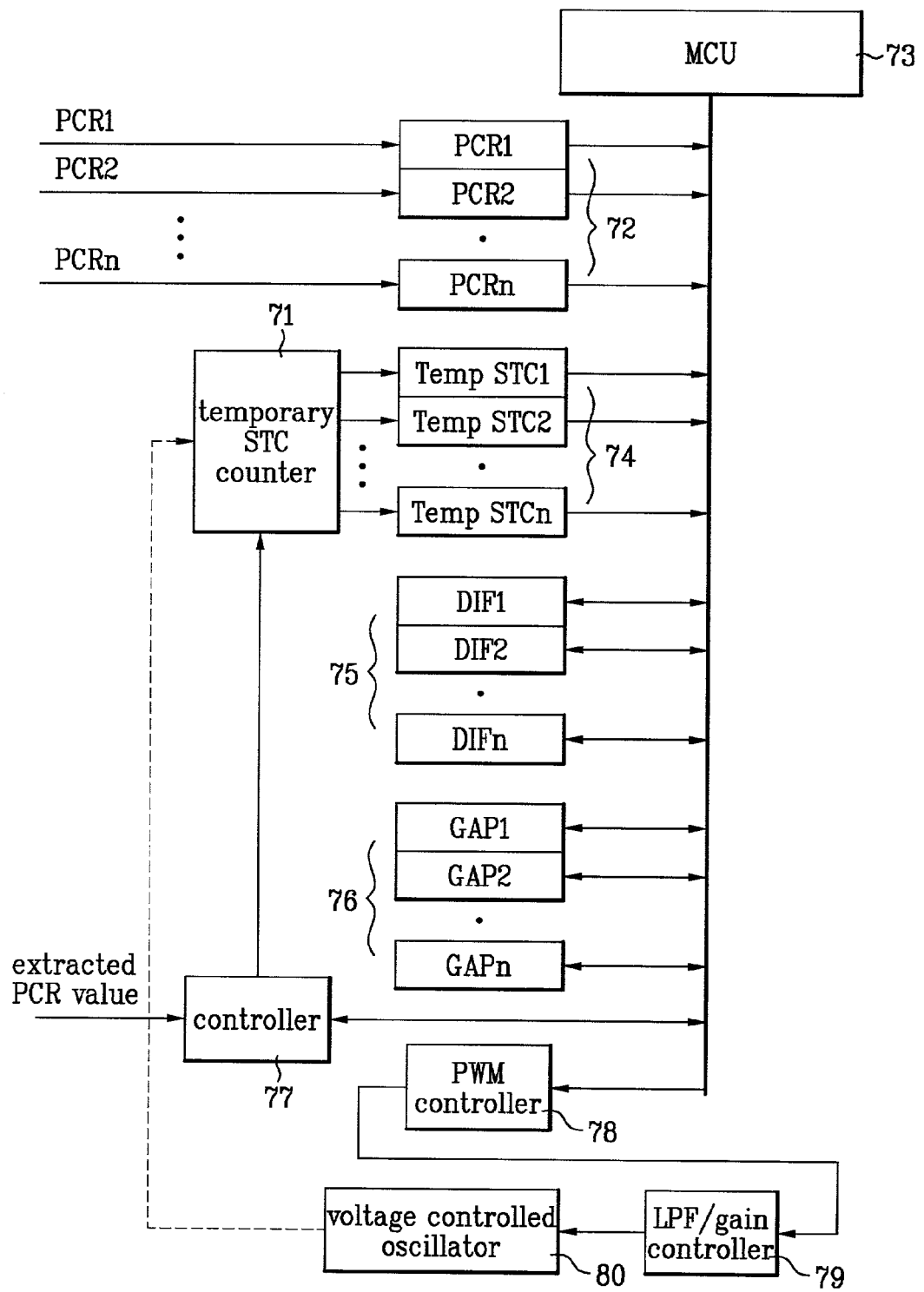
FIG. 7 is a block diagram showing a device for controlling an STC according to the second embodiment of the present invention.

As shown in FIG. 7, the device for controlling the STC according to the second embodiment of the present invention includes an n number of PCR registers 72 for temporarily storing an n number of PCR values (PCR1, PCR2, . . . , PCRn); a temporary STC counter 71 for counting an STC value increased to 27-MHz; a temporary STC register 74 for temporarily storing an n number of temporary STC counter values (Temp_STC1, Temp_STC2, . . . , Temp_STCn) counted by the temporary STC counter 71; an MCU 73 for calculating a gap value between the PCR and STC values stored in the temporary STC register 74 by performing an interrupt operation, an n number of DIF registers 75 for temporarily storing an n number of first resultant values (DIF1, DIF2, . . . , DIFn) generated from the gap value between the PCR and STC values of the MCU 73; an n number of gap registers 76 for temporarily storing second resultant values generated by calculating a gap value between the values stored in the DIF registers 75 and the first resultant values; a controller 77 for checking whether all the PCR values have been updated two or more times; a PWM controller 78 temporarily storing and outputting a mean value of all the registers from the MCU 73; an LPF/gain controller 58 for low pass filtering and controlling gain of the mean value stored in the PWM controller 78; and a voltage controlled oscillator 80 for outputting a controlled clock signal of 27-MHz to control the temporary STC counter 71 upon receiving a value that is low pass filtered by the LPF/gain controller 79.

The operation of the device for controlling an STC according to the second embodiment of the present invention will now be described.

Figure 8A:
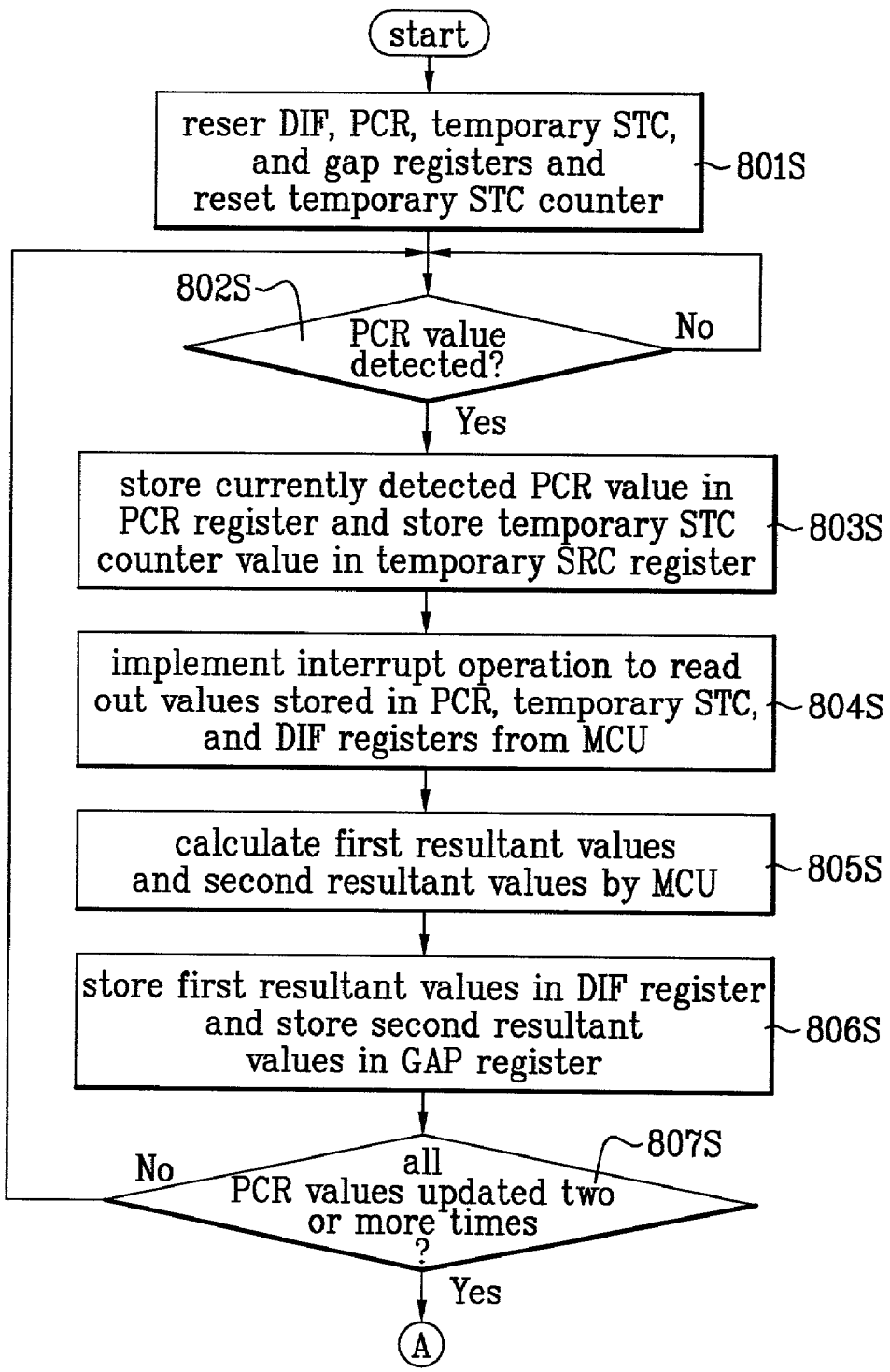
FIGS. 8a and 8b are flowcharts showing a method for controlling an STC according to the second embodiment of the present invention.
Figure 8B:
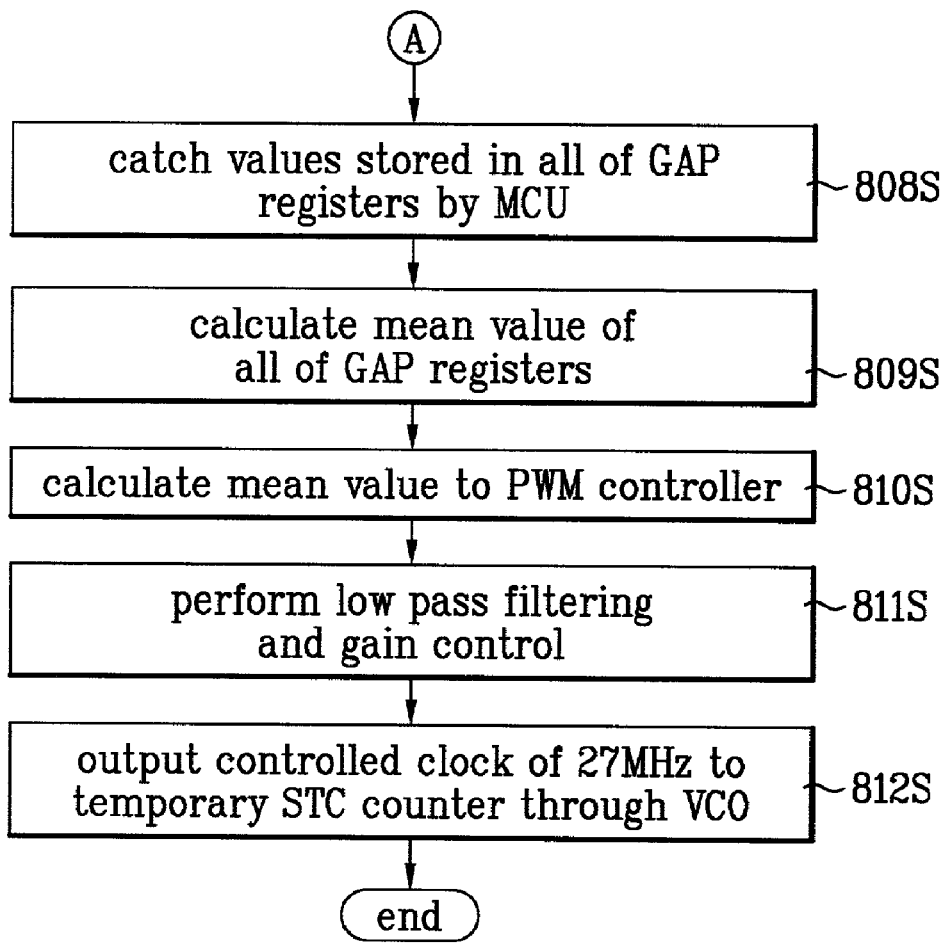

As shown in FIGS. 8a and 8b, the DIF registers 75, the PCR registers 72, the temporary STC register 74, and the gap registers 76 are reset. The temporary STC counter 70 is then initiated to increase a value of the temporary STC counter 71 to 27-MHz (801S). Subsequently, the respective PCR values input to the temporary STC counter 71 are detected (802S).

The detected PCR values and the temporary STC counter value are respectively stored in a corresponding PCR register 72 and a temporary STC register 74 (803S). Subsequently, an interrupt operation is implemented so that the MCU 73 reads out the values stored in the PCR registers 72, the temporary STC register 74, and the DIF register 75 (804S).

The first resultant values of (PCR-STC) and the second resultant values of (DIF—first resultant value) are respectively calculated by the MCU 73 (805S). The first resultant values calculated by the MCU 73 are stored in a corresponding DIF register, and the second resultant values are stored in a corresponding gap register (806S). Subsequently, it is determined whether all the PCR values have been updated two or more times (807S).

The interrupt operation is implemented so that the values stored in all the gap registers are obtained and processed by the MCU 73 (808S). The mean value of all the gap registers is calculated by the MCU 73 (809S), and the obtained mean value is stored in the PWM controller (810S). The mean value of all the gap registers is low pass filtered and gain controlled (811S). A controlled clock signal of 27-MHz is output to the temporary STC counter through the VCO (812S).

In the aforementioned method for controlling an STC according to the second embodiment of the present invention, the interrupt operation is implemented only one time after all the PCR values have been updated, because an undesirable load may be given to the MCU 73 if the interrupt operation is implemented for each of the PCR values in the MCU 73.

Following the processing described in the first and second embodiments, the clock signal of 27-MHz used in the encoder and the decoder according to the MPEG standards is locked using a phase locked loop (PLL). By doing so, various types of errors caused by a clock signal of 27-MHz which is not exactly accurate in the encoder and the decoder, jitters resulting from re-multiplexing, and delays that may occur due to structural implementation of hardware in the encoder and the decoder, are not propagated. Thus, a constant delay can be maintained.

In the device and method for controlling an STC signal according to the present invention, the above errors can be prevented from being propagated into different STC signals during multi-decoding, based on the reference STC counter value, the differential value of the respective PCR values, and a gap (i.e., difference) between the current differential value and the previous differential value.

As aforementioned, the device and method for controlling an STC according to the present invention have the following advantages.

Errors, such as a clock signal of 27-MHz which is not exactly accurate in the encoder and the decoder, jitters resulting from re-multiplexing, and delays that may occur in structurally implementing hardware of the encoder and the decoder, are not propagated in the encoder and the decoder. As errors are not propagated, lip synchronization of each program or channel can be efficiently and effectively performed, while satisfying various STC variations based on a simple hardware structure used during multi-decoding.

The foregoing embodiments and advantages are merely exemplary and are not to be construed as limiting the present invention. The teachings of the present invention can be readily applied to other types of apparatuses and methods. The description of the present invention is intended to be illustrative, and not to limit the scope of the claims. Many alternatives, modifications and variations will be apparent to those skilled in the art.

What is claimed is:

1. A device for controlling a system time clock (STC) signal of an MPEG decoder comprising:
a first subtractor receiving a plurality of program clock reference (PCR) values and a plurality of STC values, and outputting first gap values being a difference between a respectively received PCR and STC values;
a controller determining whether a current PCR value has been updated two or more times;
a plurality of difference (DIF) registers storing successively output first gap values of the first subtractor if the current PCR value has not been updated two or more times under the control of the controller;
a second subtractor calculating a second gap value being a difference between a current output value of the first subtractor and the first gap value previously stored in the plurality of DIF registers if the PCR value has been updated two or more times, and storing successively calculated second gap values in a plurality of gap registers;
a mean calculator calculating a mean value of the second gap values stored in the gap registers and outputting an output value;
an LPF/gain controller processing the output value from the mean calculator by performing low pass filtering and gain control;
a voltage controlled oscillator outputting a clock signal having a desired frequency by receiving a value from the LPF/gain controller; and
a temporary STC counter counting based on the clock signal, to output the STC value to the first subtractor.

2. The device of claim 1, wherein the output value of the mean calculator is input to the LPF/gain controller through a pulse width modulator (PWM) controller.

3. The device of claim 1, wherein the controller controls the temporary STC counter, the first subtractor, the second subtractor, and the mean calculator, and receives an external PCR extracted value.

4. The device of claim 1, wherein the DIF registers, the gap registers, the temporary STC counter are reset before the first gap values between the plurality of PCR values and the STC value are calculated.

5. A method for controlling a system time clock (STC) of an MPEG decoder comprising the steps of:
increasing a temporary STC value to a desired frequency through an initial reset step;
detecting the presence of a program clock reference (PCR) value in a digital data stream to load the detected PCR value as the temporary STC value;
first calculating a difference between each subsequently detected PCR value and the loaded temporary STC value to obtain first resultant values;
first determining whether a currently detected PCR value has been updated two or more times;
storing the first resultant values when the first determination result indicates the currently detected PCR values have not been updated two or more times and returning to the detecting step;
second calculating gap values between a current first resultant value and the stored first resultant values to obtain second resultant values;
updating the first resultant values and storing the second resultant values;
second determining whether a predetermined number of the detected PCR values have been updated two or more times;
obtaining a mean value of the stored second resultant values if the second determination result indicates the predetermined number of the detected PCR values have been updated two or more times;
returning to the detecting step of the PCR values if the second determination result indicated the predetermined number of the detected PCR values have not been updated two or more times; and
outputting a controlled clock signal with a desired frequency based on the mean value of the second resultant values.

6. A device for controlling a system time clock (STC), comprising:
a plurality of program clock registers to temporarily store a plurality of program clock reference (PCR) values;
a temporary STC counter to count an STC value based on a control clock signal;
temporary STC registers to temporarily store the plurality of temporary STC values counted by the temporary STC counter;
a micro-controller unit (MCU) to calculate a gap value being a difference between a respectively received PCR values and STC values stored in the temporary STC registers;
a plurality of difference registers (DIF) to temporarily store a plurality of first resultant values generated from the gap value between the PCR and STC values of the MCU;
a plurality of gap registers to temporarily store second resultant values generated by calculating a gap value between a current and previous first resultant value stored in the DIF registers;
a controller to check whether all the PCR values have been updated two or more times;
a pulse width modulator (PWM) controller generating a mean value of a predetermined number of the second based resultant values;
an LPF/gain controller to perform low pass filtering and gain control of output from the PWM controller; and
a voltage controlled oscillator to output the control clock signal based on output of the the LPF/gain controller.

7. The device of claim 6, wherein the DIF registers, the PCR registers, the temporary STC registers, the gap registers, and the temporary STC counter are initiated to increase a value of the temporary STC counter to a desired frequency before temporarily storing the plurality of PCR values.

8. A method for controlling a system time clock (STC) of an MPEG decoder comprising the steps of:
- detecting respective program clock register (PCR) values and respectively storing the detected PCR values and a temporary STC value;
- implementing an interrupt operation to read out the PCR value and the temporary STC counter value and respectively calculating first resultant values of (PCR value—STC value) and second resultant values of (a current first resultant value—a previous first resultant value);
- storing the calculated first resultant values in a corresponding register and storing the second resultant values in a corresponding register;
- determining whether a predetermined number of the PCR values have been updated two or more times;
- obtaining a mean value of the second resultant values and storing the mean value when the determining step determines that the predetermined number of the PCR values have been updated two or more times;
- outputting a controlled clock of a desired frequency using the stored mean value; and
- generating the temporary STC value based on the controlled clock.

9. The method of claim 8, wherein the interrupt operation is implemented only one time after the predetermined number of the PCR values have been updated without respectively implementing the interrupt operation for the respective PCR values.

10. The method of claim 9, further comprising the step of returning to the step of detecting the PCR values if the determining step determines that the predetermined number of the PCR values have not been updated two or more times.

11. An apparatus for generating a decoder clock signal, comprising:
- a detector detecting a plurality of program clock reference (PCR) values encoded by an encoder clocked using an encoder clock signal;
- a processor generating a first initial difference value by calculating a difference between a first detected PCR value and a system time clock (STC) value generated when the first PCR value was detected;
- the processor generating a second initial difference value by calculating a difference between a second detected PCR value and a STC value generated when the second PCR value was detected;
- the processor generating a composite difference value by calculating a difference between the first initial difference value and the second initial difference value, the processor calculating an arithmetic mean of the composite difference values for predetermined number of PCR values detected by the detector;
- an oscillator generating a decoder clock signal based on the composite difference value; and
- a counter generating the system time clock values based on the decoder clock signal.

12. The apparatus of claim 11, further comprising:
a controller determining whether a current PCR value has been updated two or more times; and
a plurality of difference (DIF) registers storing successively the first initial difference values output from the processor if the current PCR value has not been updated two or more times under the control of the controller; and wherein
the processor calculates the second initial difference values if the PCR value has been updated two or more times, and stores successively calculated second initial difference values in a plurality of gap registers.

13. The apparatus of claim 11, wherein the processor comprises:
- a first subtractor generating a first initial difference value by calculating a difference between the first detected PCR value and the STC value generated when the first PCR value was detected, and generating a second initial difference value by calculating the difference between a second detected PCR value and the STC value generated when the second PCR value was detected;
- a second subtractor generating the composite difference value by calculating the difference between the first initial difference value and the second initial difference value; and
- a mean calculator calculating an arithmetic mean of the composite difference values for a predetermined number of PCR values detected by the detector.

14. The apparatus of claim 13, wherein the processor further comprises:
- a plurality of first registers receiving and storing the first and second initial difference values from the first subtractor; and
- a plurality of second registers receiving and storing the composite difference values from the second subtractor.

15. The apparatus of claim 14, wherein the processor further comprises:
- a pulse width modulation (PWM) controller receiving an output from the mean calculator and outputting a pulse width modulated signal based on the output from the mean calculator; and
- a low pass filter (LPF) and gain controller low pass filtering and gain controlling the pulse width modulated signal from the PWM controller and supplying a resulting signal to the oscillator.

16. The apparatus of claim 11, wherein the processor comprises:
- a common data line;
- a plurality of registers commonly connected to the common data line, and storing a plurality of the first and second initial difference values and storing a plurality of the composite difference values; and
- a micro-controller operatively connected with the registers via the common data line, generating the first initial difference value, generating the second initial difference value, generating the composite difference value, and calculating an arithmetic mean of the composite difference values for a predetermined number of the PCR values.

17. The apparatus of claim 16, wherein the processor further comprises:
- a pulse width modulation (PWM) controller connected with the common data line, receiving an output from the micro-controller, and outputting a pulse width modulated signal; and
- a low pass filter (LPF) and gain controller receiving the pulse width modulated signal from the PWM controller, and outputting a low pass filtered and gain controlled signal to the oscillator.

18. The apparatus of claim 17, further comprising a plurality of temporary STC registers connected with the common data line and storing the count values from the counter prior to processing by the micro-controller.

* * * * *